US006198987B1

(12) United States Patent
Park et al.

(10) Patent No.: US 6,198,987 B1
(45) Date of Patent: Mar. 6, 2001

(54) METHOD AND A MULTI-FUNCTIONAL APPARATUS FOR DETERMINING THE CLASS OF A VEHICLE

(75) Inventors: Won-seo Park, Sungnam; Han-kyu Jeong, Incheon, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/060,465

(22) Filed: Apr. 15, 1998

(30) Foreign Application Priority Data

Apr. 18, 1997 (KR) ..................................... 97-14458

(51) Int. Cl.[7] ............................ G06F 17/00; G06F 7/00

(52) U.S. Cl. ............................ 701/1; 701/28; 701/117; 340/928; 340/937

(58) Field of Search ............................ 701/1, 117, 119, 701/223, 96, 28; 340/928, 933, 937, 942

(56) References Cited

U.S. PATENT DOCUMENTS

| | | |
|---|---|---|
| 3,090,941 | 5/1963 | Breese . |
| 3,705,976 * | 12/1972 | Platzman . |
| 3,794,966 | 2/1974 | Platzman . |
| 3,872,283 | 3/1975 | Smith et al. . |
| 3,914,733 | 10/1975 | Viracola . |
| 3,927,389 | 12/1975 | Neeloff . |
| 4,493,103 | 1/1985 | Yamashita et al. . |
| 4,789,941 | 12/1988 | Nunberg . |

(List continued on next page.)

FOREIGN PATENT DOCUMENTS

| | | |
|---|---|---|
| 54-133899 | 10/1979 | (JP) . |
| 59-49298 | 4/1984 | (JP) . |
| 64-80834 | 3/1989 | (JP) . |
| 64-80835 | 3/1989 | (JP) . |
| 2-277198 | 11/1990 | (JP) . |
| 5-217041 | 8/1993 | (JP) . |
| 6-309588 | 11/1994 | (JP) . |
| 8-86614 | 4/1996 | (JP) . |
| 8-221615 | 8/1996 | (JP) . |
| 8-221617 | 8/1996 | (JP) . |
| 8-221620 | 8/1996 | (JP) . |
| 8-235489 | 9/1996 | (JP) . |
| 8-305914 | 11/1996 | (JP) . |
| 9-62982 | 3/1997 | (JP) . |
| 9-62984 | 3/1997 | (JP) . |
| 9-259388 | 10/1997 | (JP) . |

*Primary Examiner*—William A. Cuchlinski, Jr.
*Assistant Examiner*—Gertrude Arthur
(74) *Attorney, Agent, or Firm*—Robert E. Bushnell, Esq.

(57) ABSTRACT

A multi-functional apparatus for determining the class of a vehicle that can be used in a toll road collecting system. The apparatus for determining vehicle class according to the present invention includes a vehicle sensor, a vehicle separator installed along both sides of the lane, an axle detector using four switch contacts, a camera installed above the axle detector for photographing the vehicle as a reference image and photographing the vehicle when a first axle of the vehicle is sensed by the axle detector, and a vehicle class determiner that calculates the width and the length of the vehicle by using the difference value between the reference image and the vehicle image, determines the number of axles, and thus determines the class of the vehicle.

This multi-functional apparatus not only determines the class of a vehicle, but because it uses photographic images to determine the length and width of a vehicle, it also generates evidence that can be used at a future date. Additionally, the above apparatus can be installed so that it effectively operates as a "rolling" toll collecting system. The multi-functional apparatus determines the class of various vehicles, minimizes errors in discriminating between vehicle classes, can be flexibly applied to various circumstances by modifying software, and can be efficiently maintained and managed.

15 Claims, 5 Drawing Sheets

U.S. PATENT DOCUMENTS

| | | | | |
|---|---|---|---|---|
| 4,947,353 | | 8/1990 | Quinlan, Jr. . | |
| 4,963,723 | | 10/1990 | Masada . | |
| 5,101,200 | | 3/1992 | Swett . | |
| 5,204,675 | | 4/1993 | Sekine . | |
| 5,392,034 | | 2/1995 | Kuwagaki . | |
| 5,422,473 | | 6/1995 | Kamata . | |
| 5,451,758 | | 9/1995 | Jesadanont . | |
| 5,528,234 | | 6/1996 | Mani et al. . | |
| 5,602,375 | | 2/1997 | Sunahara et al. . | |
| 5,686,906 | | 11/1997 | Ono et al. . | |
| 5,734,337 | * | 3/1998 | Kupersmit | 340/937 |
| 5,750,069 | * | 5/1998 | Lew et al. | 340/933 |
| 6,040,785 | | 3/2000 | Park et al. | 340/928 |

* cited by examiner

METHOD AND A MULTI-FUNCTIONAL APPARATUS FOR DETERMINING THE CLASS OF A VEHICLE

CLAIM OF PRIORITY

This application makes reference to, incorporates the same herein, and claims all rights accruing thereto under 35 U.S.C. § 119 through my patent application entitled Apparatus for Determining Vehicle Class and Method Therefor earlier filed in the Korean Industrial Property Office on the Apr. 18, 1997 and there duly assigned Serial No. 1997/14458.

BACKGROUND OF THE INVENTION

1. Field of the Invention

The present invention relates to determining the class of a vehicle and, more specifically, to a method and an apparatus for determining the class of a vehicle for use in a toll collection system.

2. Background Art

Vehicle-class determining apparatuses used for the collection of tolls generally discriminate between vehicle classes, by collecting various data such as the length, height, and width of a vehicle, the number of axles of the vehicle, the distance between the wheels, and the width of the wheels. The various bits of information are then analyzed and compared to a data base to determine the appropriate vehicle class. Once the vehicle class is determined an appropriate fare is then assessed.

Some techniques for determining the class of a vehicle are shown, for example, in U.S. Pat. No. 5,392,034 to Kuwagaki entitled Vehicle Classification System Using Profile, U.S. Pat. No. 4,789,941 to Nunberg entitled Computerized Vehicle Classification System, U.S. Pat. No. 3,914,733 to Viracola entitled System Including a Pressure Switch for Counting Axles and Classifying Vehicles, U.S. Pat. No. 3,794,966 to Platzman entitled Automatic Vehicle Classification and Ticket Issuing System, U.S. Pat. No. 3,872,283 to Smith entitled Vehicle Identification Method and Apparatus, U.S. Pat. No. 4,493,103 to Yamashita entitled Automatic Toll-Ticket Issuing Apparatus, U.S. Pat. No. 5,528,234 to Mani entitled Traffic Monitoring System for Determining Vehicle Dimensions, Speed, and Class, U.S. Pat. No. 3,927,389 to Neeloff entitled Device for Determining, During Operation, the Category of a Vehicle According to a Pre-Established Group of Categories, U.S. Pat. No. 5,101,200 to Swett entitled Fast Lane Credit Card, and U.S. Pat. No. 3,090,941 to Breese entitled Toll Collecting Device.

Techniques currently in use today lack the ability to detect cars that pass the vehicle class detector apparatus at great speed or closely behind another car. For example, a common device for determining the class of a vehicle is the treadle. Despite the treadle's simple design, employing a contact method, the treadle method generates serious errors. Parts of the treadle must be replaced often and mis-operation may occur since data for determining the class of a vehicle varies depending on the physical contact of the tires. Also, the treadle apparatus, because it uses the contact method, cannot be used in a "rolling" toll collection system since it is hard to install and it cannot accurately sense the vehicle when speeds exceed 60 km/hr. Furthermore, systems that rely on optical sensors, lasers, or transducers can be extremely accurate for collecting vehicle data to determine the class of a vehicle, but they do not generate evidence that can later be used against people that do not pay the toll or that are being prosecuted for another crime, such as car jacking, kidnaping, or car theft.

I believe that it is possible to improve on the current techniques for determining the class of a vehicle while reducing errors due to poor tire contact, lack of evidence generation for future use, high speed rolling toll collection, and cars being closely positioned near each other will improve automated toll collection, lower the overall cost on taxpayers to support local highways, and allow for evidence to be generated at the same time as vehicle dimensions are determined.

SUMMARY OF THE INVENTION

It is an object of the present invention to provide an improved method and apparatus for determining the class of a vehicle.

It is another object to provide a method and apparatus for determining the class of a vehicle that reduces errors caused by vehicles traveling a high speed.

It is still another object to provide a method and apparatus for determining the class of a vehicle that reduces errors due to poor tire contact.

It is yet another object to provide a method and an apparatus that reduces errors caused by cars traveling close together.

It is a further object to provide a method and an apparatus that can collect data regarding the dimensions of a car simultaneously with generating evidence that can be used in future proceedings.

To achieve these and other objects, an apparatus may be installed in a traffic lane that may be constructed with a vehicle sensor that determines when a vehicle enters a lane. A camera is located above the lane. The camera takes a photograph of the vehicle and sends it to a computer that uses the top image to determine the width and the length of the vehicle. Then the computer uses the length and width information and information from a treadle located in a lane to determine the class of the vehicle. Additionally, the computer stores the image data for a predetermined period of time so that it may be recalled later and used for evidentiary purposes.

An apparatus for determining the class of a vehicle as constructed according to an embodiment of the present invention may use a vehicle sensor to determine when a vehicle enters the lane and then generates a vehicle sense signal in response to the detection of the vehicle. Additionally, a vehicle separator may be installed at both sides of the lane for measuring a time interval that starts when the front end of a vehicle passes the vehicle separator and ends when the rear end of the vehicle passes the separator. Furthermore, an axle detector may also be used that may be constructed using four switch contacts that are arranged on the bottom of the lane and generate contact signals when pressure from the wheels of the vehicle on the respective switch contacts is detected. A camera may also be installed above the axle detector to photograph the vehicle as a reference image and to photograph the vehicle when a first axle of the vehicle is sensed by the axle detector during the interval of time bounded by the time when the front of the car passes the vehicle separator and when the rear end of the car passes the separator. A vehicle class determiner may also be used to calculate the width and length of the vehicle using the difference between the reference image and the vehicle image, determining the number of axles and discriminating between forward and backward movements of the vehicle by the order and number of the contact signals generated in the axle detector, and determining the class of the vehicle. The images of the vehicle can then be stored for a predetermined amount of time so that they can be later retrieved for evidentiary purposes when someone fails to pay a toll, is driving a stolen car, etc.

A method for determining the class of vehicle entering a lane by an apparatus for determining vehicle class uses a vehicle sensor to determine when a vehicle is entering a predetermined lane. Then, a vehicle separator measures an interval time from when the front end portion of the vehicle passes the separator sensor to when the rear end portion of the vehicle passes the separator sensor. An axle detector senses the number of axles and discriminates between forward and backward movements of the vehicle to collect data. Lastly, a camera installed above the axle detector photographs a reference image and a vehicle image that can be used to determine the width and length of the vehicle and provide potential evidence. Then a computer or controller determines the width and length of the vehicle, and uses that data along with the number of axles of the vehicle to determine the class of the vehicle.

The first step is to photograph the background of the vehicle using the camera to obtain a reference image that is stored in a predetermined memory location of the vehicle class determiner. The second step is when the front end of the vehicle is sensed by the vehicle separator and the vehicle with the background is then photographed by the camera when a first axle of the vehicle is detected by the axle detector. The third step determines the value of the difference between the second photographed vehicle image and the reference image stored in memory. This is calculated using the difference in the width and length of the vehicle as calculated by a vehicle width and length calculating unit. The fourth step is to determine the number of axles that the passing vehicle has using an axle detector. Then, during the fifth step a vehicle determiner compares the width, length, and number of axles of the passing vehicle with a data base of vehicles and determines the appropriate class for the passing vehicle.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1A:
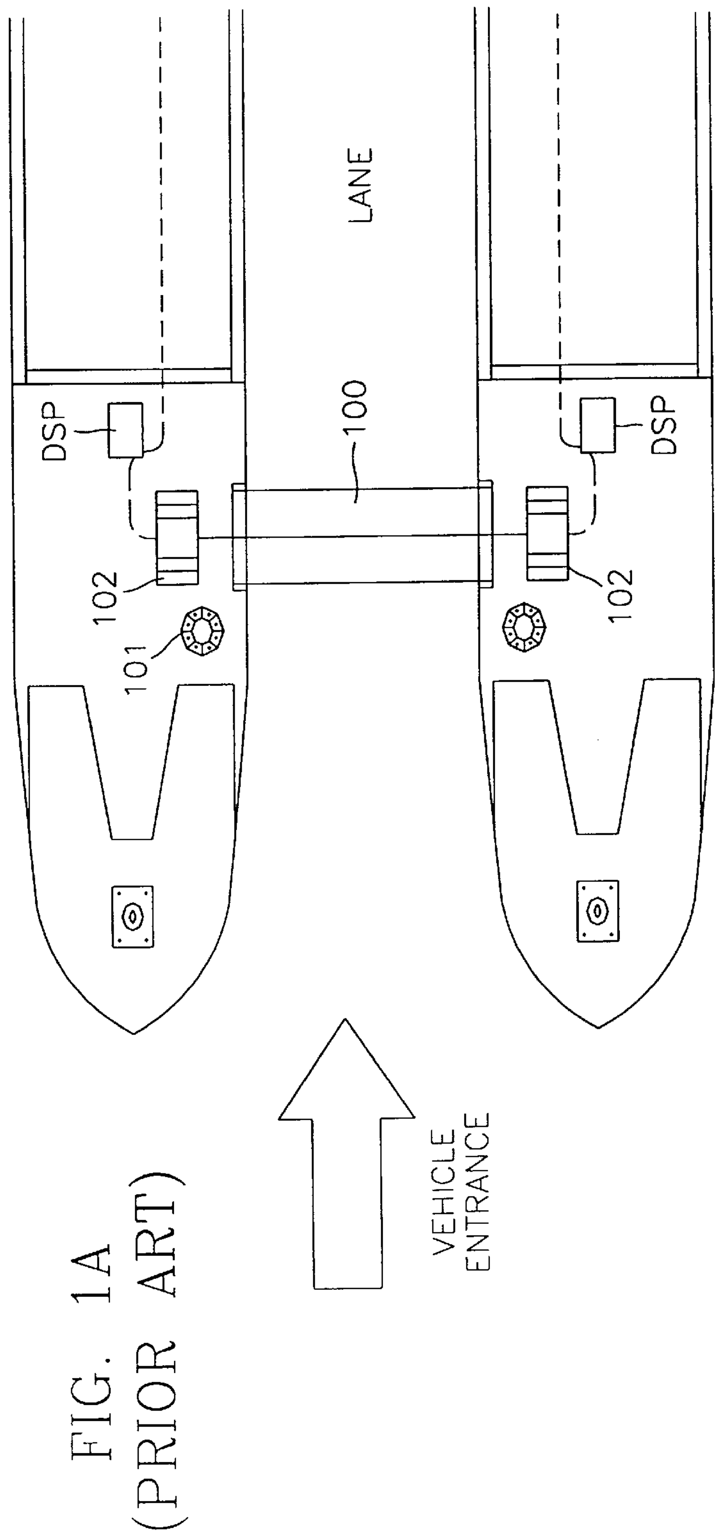
FIG. 1A (PRIOR ART)
FIG. 1*a* is a plan view of one lane at a toll gate that uses a treadle to determine the class of a vehicle.
Figure 1B:
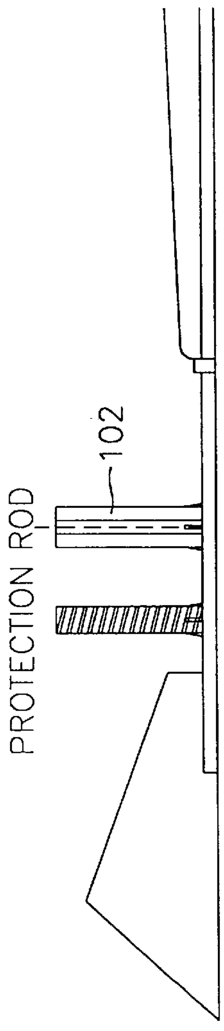
FIG. 1B (PRIOR ART)
FIG. 1*b* is a side view of one lane at a toll gate that uses a treadle to determine the class of a vehicle.

Turning now to the drawings, FIGS. 1*a* and 1*b* are a plan view and a side view of one lane in a toll gate that uses a treadle type of contact apparatus to determine the class of a vehicle. The apparatus uses the contact method to determine the class of a vehicle by sensing the number of axles, the width of the wheels and the distance between the wheels of the vehicle using both vehicle separator 102 and treadle board device 100. Vehicle separator 102 determines when a vehicle has moved through the toll gate by determining whether a vehicle is present using an optical sensor. Treadle board device 100 includes load cells that convert changes in resistance values at positions depressed by the tires of a vehicle into voltage signals. The voltage signals are then converted to digital signals and sent to a Digital Signal Processor (DSP). The digital signals are processed by the DSP to calculate the width of the tires and the distance between the wheels. The values representing the width of the tires and the distance between the wheels are then outputted by the DSP.

Figures 2A, 2B:
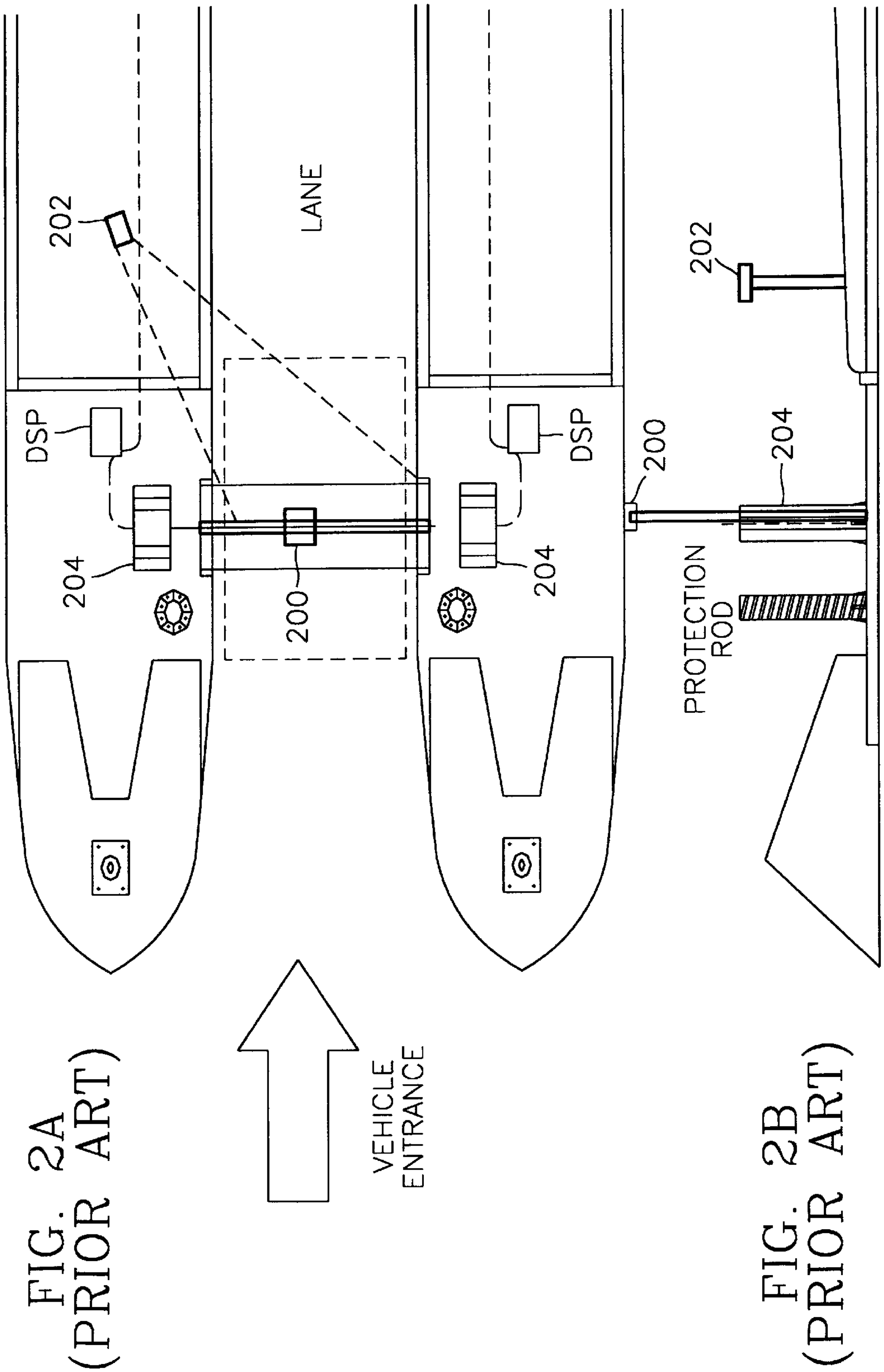
FIG. 2A (PRIOR ART)
FIG. 2B (PRIOR ART)
FIG. 2*a* is a plan view of a toll gate showing the structure of an apparatus for determining the class of a vehicle using an image processing method to determine the class of a vehicle.
FIG. 2*b* is a side view of a toll gate that uses the apparatus of FIG. 2*a* to determine the class of a vehicle.

A vehicle class identifying apparatus is shown in the plan and side view of a toll gate, as shown in FIGS. 2*a* and 2*b*. An image processing method is used to detect the class of a passing vehicle. To perform the image processing method the apparatus uses vehicle separator 204 to determine when a vehicle is passing by the two cameras 200 and 202 that are used to generate the image data needed. The vehicle separator can be a microwave sensor and also works well at discriminating between two cars that are following each other closely. One camera is positioned above the vehicle and a second camera is positioned to the side of the vehicle, as shown in FIG. 2*a*. This allows for the necessary image data to be collected to calculate the height, width, and length of a passing vehicle. The width and length are calculated by capturing an image of the vehicle with the first camera 200, installed above the traffic lane, and then the height of the vehicle is calculated by capturing an image of the vehicle with the second camera 202, installed to the side of the traffic lane. Thus, the vehicle class may be determined by a computer or controller that uses the above data to calculate the width, length, and height. Furthermore, the image data may be saved for a predetermined amount of time so that the images can be later recalled for evidentiary purposes.

Figure 3:
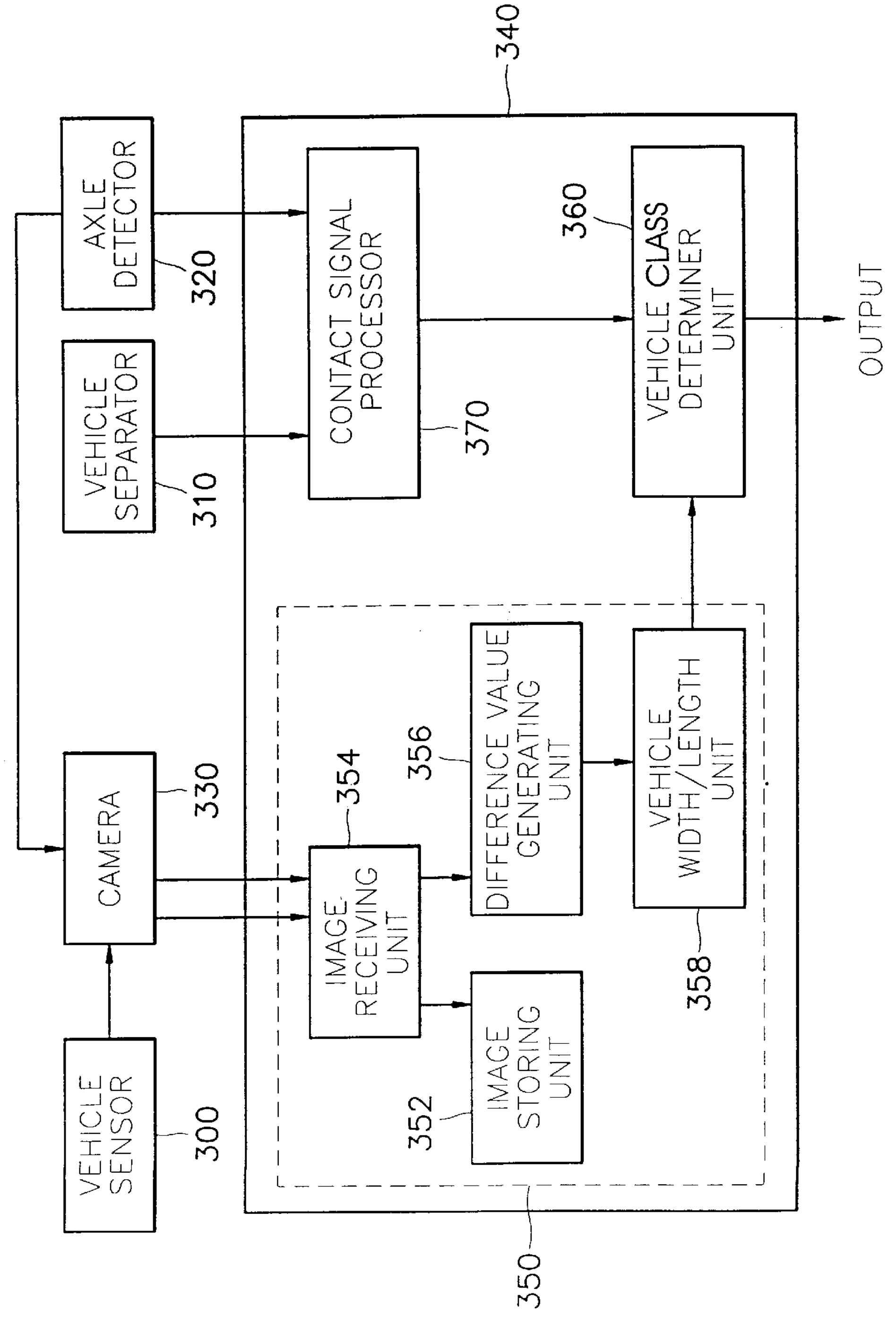
FIG. 3 is a block diagram showing the structure of an apparatus for determining vehicle class according to an embodiment of the present invention.

An embodiment of an apparatus for detecting the class of passing vehicles according to the principles of the present invention is show in the block diagram of FIG. 3. The apparatus may be constructed using vehicle sensor 300, vehicle separator 310, axle detector 320, camera 330, and vehicle class determiner 340. Vehicle sensor 300 detects when a vehicle enters a predetermined lane, such as a lane at a toll gate, and generates a vehicle sense signal. Preferably, a microwave sensor is used as the vehicle sensor.

Vehicle separators 310 are installed along both sides of a lane to sense when the front end of a vehicle passes the separators and to also detect when the rear end of the same vehicle passes the separators. Vehicle separator 310 may be constructed using a light emitting device and a light receiving device. The optical sensor determines when an optical signal from the light emitting device is interrupted and prevented from being received by the light receiving device. This occurs when the front end of a vehicle interrupts a light beam. The end of a vehicle is detected when the light beam is no longer interrupted by the passing vehicle and is again received by the light receiving element.

Axle detector 320 has four switch contacts installed under and across the lane that generate contact signals when pressure from the wheels of the vehicle is exerted on the respective switch contacts. Vehicle class determiner 340 determines the number of axles by analyzing the generating order and the number of times the contact signals are generated at the respective switch contacts of axle detector 320 and discriminates between the forward and the backward movements of the vehicle.

Camera 330, that is installed on the upper side of the axle detector 320, photographs the background of the vehicle as a reference image when the vehicle is detected by the vehicle detector, such as vehicle sensor 300, and photographs, with the background, the vehicle as a vehicle image when the first axle of the vehicle is sensed by the axle detector 320 during the time that the optical sensor determines that a vehicle is passing.

Vehicle class determiner 340 has a processor, a memory, an input and output device, and predetermined software that calculates the width and length of the vehicle using difference values from the reference image and the vehicle image. The vehicle class determiner detects the number of axles and whether there is forward or backward movement of the vehicle using the order and number of contact signals generated by axle detector 320. The data is then used to determine the vehicle class. The vehicle class determiner may be constructed using image processing unit 350, vehicle class determiner unite 360, and contact signal processor 370.

Image processing unit 350 receives a reference image and vehicle image from camera 330, obtains a difference value between the two images, and calculates the width and length of the vehicle. Image processing unit 350 may be constructed with image receiving unit 354, image storing unit 352, difference value generating unit 356, and vehicle width and length calculating unit 358.

The image receiving unit receives a reference image and a vehicle image from camera 330 and transmits the reference image to image storing unit 352 and the vehicle image to difference value generating unit 356. Image storing unit 352 temporarily stores the reference image that is received from image receiving unit 354. In a preferred embodiment of the present invention, image storing unit 352 compares the received reference image with the stored reference image. The image storing unit ignores the received reference image if the difference between the two images is considerable since it is determined that the images of an unnecessary vehicle or other object has likely interfered with the regular operation of camera 330. Otherwise, the image storing unit 352 replaces the stored reference image with the received reference image.

Difference value generating unit 356 calculates the rate of change of the vehicle using the image received from the image receiving unit 354 and using the reference image temporarily stored in image storing unit 352 to generate a difference value. Vehicle width and length calculating unit 358 calculates the width and length of the vehicle entering the lane using the difference value generated in difference value generating unit 356.

Contact signal processing unit 370 determines the number of axles and discriminates between forward and backward movements of the vehicle by the order and number of respective contact signals generated by the four switch contacts of axle detector 320. The contact signal processing unit then transmits data signals to vehicle class determiner unit 360. Vehicle class determiner unit 360 compares the width and length of the vehicle calculated in the image processing unit 350 and the number of axles determined by the contact signal processing unit 370 with predetermined vehicle class data of respective vehicle classes and determines a corresponding vehicle class. Additionally, the vehicle images can be stored in memory for a predetermined period of time for recall later as evidentiary material.

Figure 4A:
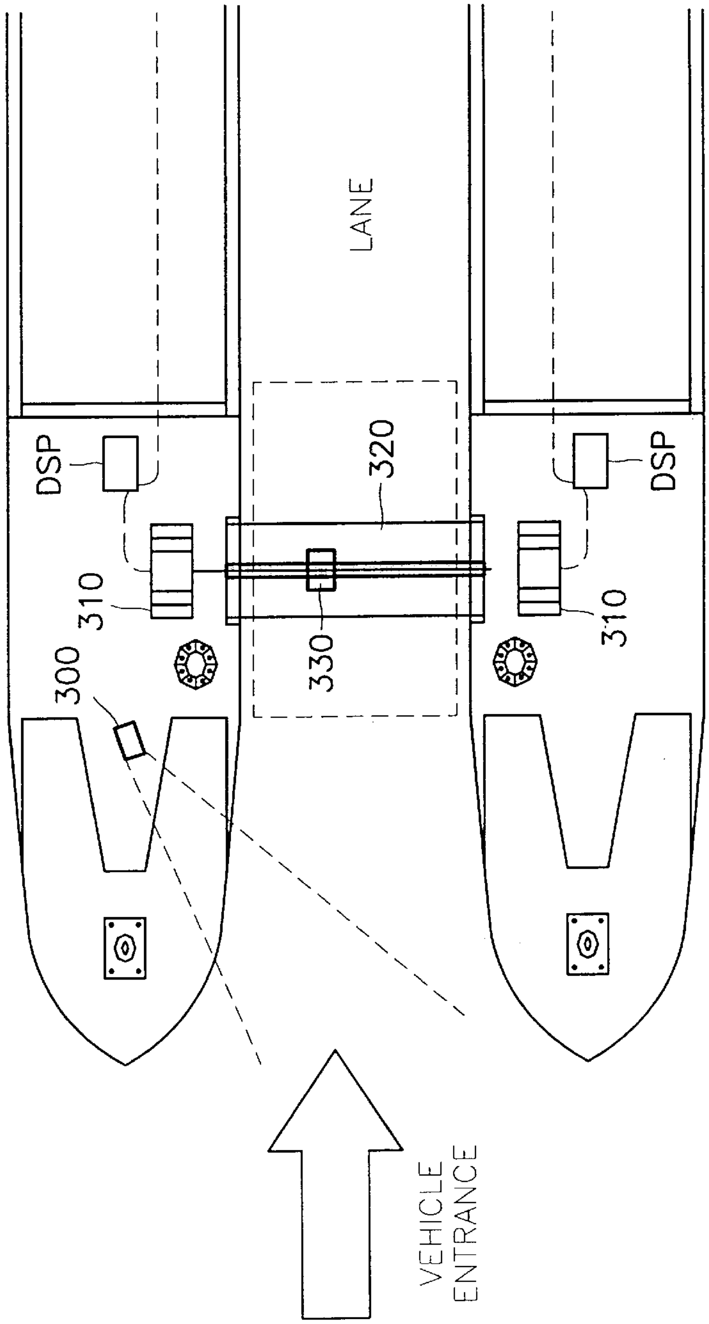
FIG. 4*a* is a plan view of a toll gate that is using the apparatus of FIG. 3 to determine the class of a vehicle.
Figure 4B:
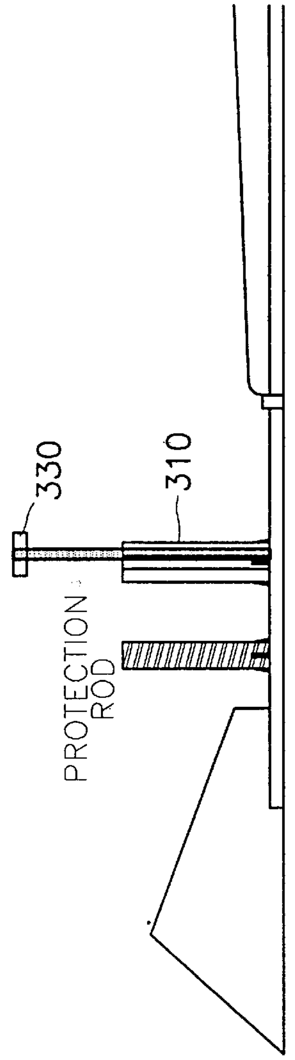
FIG. 4*b* is a side view of a toll gate that is using the apparatus of FIG. 3 to determine the class of a vehicle.
Figure 5:
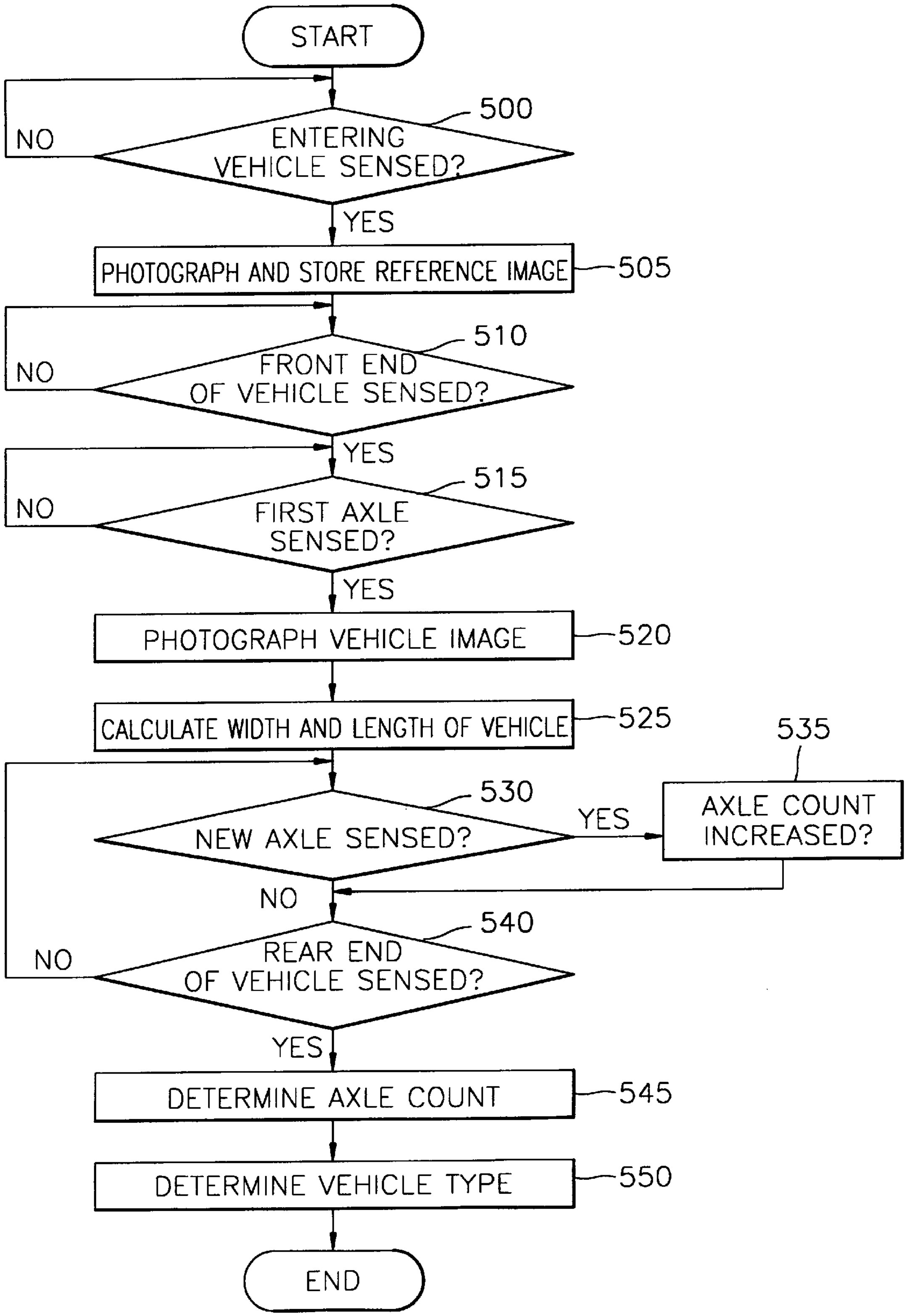
FIG. 5 is a flow chart for explaining the steps of determining vehicle class according to the present invention.

FIGS. 4*a* and 4*b* are a plan view and a side view of a lane in a toll gate that uses an apparatus as constructed according to the principles of the present invention for determining the class of a vehicle. FIG. 5 is a flowchart illustrating a method for determining the class of a vehicle class in the apparatus for determining vehicle class according to the present invention shown in FIG. 3, as well as in FIGS. 4A and 4B. When a vehicle entering the toll lane is sensed by vehicle sensor 300, the background of the vehicle is photographed by camera 330 as a reference image and the reference image is stored in the memory of vehicle class determiner 340, during steps 500 and 505. The steps in which the reference image are stored in memory begin with the reference image being photographed by camera 330 and transmitted to vehicle class determiner 340. The reference image photographed by camera 330 is called a first reference image and the reference image previously stored in the memory is called a second reference image. The first reference image is ignored when there is a considerable difference between the first reference image and the second reference image, and otherwise the second reference image is replaced with the first reference image.

When the front end of a vehicle is sensed by vehicle separator 310, during step 510, and the first axle of the vehicle is sensed by the axle detector 320, during step 515, the image of the vehicle with background is photographed by the camera 330, during step 520.

In step 525, the width and length of the vehicle are calculated in the vehicle class determiner 340 by calculating the difference value between the photographed vehicle image and the reference image stored in the memory. During steps 530 through 545, when the rear end of the vehicle is sensed by vehicle separator 310, the number of axles of the vehicle detected by the axle detector 320 is determined by vehicle class determiner 340.

Then, in step 550, the vehicle class determiner 340 compares the width and length of the vehicle and the number of axles with the stored data of respective vehicle classes and calculates a corresponding vehicle class. Additionally, this method also provides potential evidence in the form of the two images taken of the vehicle by the cameras. Not only will this aid in catching toll breakers, but it also has potential value in catching car-jackers, kidnappers, auto thieves, and fugitives. Furthermore, the apparatus described above can be installed less obtrusively so that it can be used in a "rolling" toll collecting system.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A multi-functional device for determining a class of a vehicle, comprising:

a computer;

a vehicle sensor that detects the entry of said vehicle into a lane to provide a vehicle detected signal;

a separator sensor that determines when an end of said vehicle has passed said separator sensor;

a treadle located in said lane, that detects an axle on said vehicle passing said treadle, and transmits an axle signal to said computer each time an axle of said vehicle is detected by said treadle;

a camera located above said lane that receives said vehicle detected signal and photographs a reference image of a background of said vehicle when said vehicle detected signal is received, that photographs an image of said vehicle when a first axle of said vehicle is detected by said treadle during a period of time said separator sensor determines said vehicle is passing said separator sensor, and transmits an image signal representing said reference image and transmits an image signal representing said image of said vehicle to said computer, said image of said vehicle and said reference image being used by said computer to determine a length of said vehicle and a width of said vehicle; and said computer using a plurality of data from both said treadle and said camera to determine said class of said vehicle and said computer using a difference between said reference image and said image of said vehicle to determine said width of said vehicle and said length of said vehicle.

2. The multi-functional device of claim 1, further comprising said computer storing said image of said vehicle in a memory.

3. The multi-functional device of claim 1, further comprised of said treadle being a contact detector that detects an axle of said vehicle using a plurality of contact switches.

4. The multi-functional device of claim 1, further comprised of said treadle providing a plurality of tire data comprising a number of axles of said vehicle, a distance between the wheels of said vehicle, and a thickness of the wheels of said vehicle.

5. The multi-functional device of claim 1, further comprised of said camera taking a first picture of said background of said vehicle as said reference image when said vehicle is detected by said vehicle sensor and taking a second picture of said vehicle with said background as said image of said vehicle when said first axle of said vehicle is detected by said treadle, said first picture being discarded if a previously stored background picture is different from said first picture by more than a predetermined amount.

6. The multi-functional device of claim 1, further comprised of said treadle being capable of discriminating between forward movement and backward movement of said vehicle by an order and a number of activations of a plurality of contact switches on said treadle.

7. The multi-functional device of claim 1, further comprised of said vehicle sensor being a microwave sensor.

8. An apparatus installed in a traffic lane for determining a class of a vehicle entering said traffic lane, comprising:

a vehicle sensor for detecting said vehicle entering said traffic lane and generating a vehicle detected signal;

a separation detector installed along said traffic lane for measuring a period of time starting when a front end of said vehicle passes said separation detector and ending when a rear end of said vehicle passes said separation detector;

an axle detector for generating a contact signal due to the pressure of a wheel of said vehicle;

a camera installed above said traffic lane, said camera photographing a background of said vehicle as a reference image when said vehicle detected signal is generated, and said camera photographing said vehicle as a vehicle image during said period of time; and a vehicle class determiner that determines a width of said vehicle and a length of said vehicle using a difference between said reference image and said vehicle image, and that determines the number of axles of said vehicle using each said contact signal for said vehicle from said axle detector to determine said class of said vehicle.

9. The apparatus of claim 8, further comprising said vehicle class determiner storing said vehicle image in a memory for a predetermined period of time for retrieval for evidentiary purposes.

10. The apparatus of claim 8, further comprised of said vehicle class determiner further comprising:

an image processing unit for receiving said reference image of said background of said vehicle from said camera, receiving said vehicle image of said vehicle from said camera, determining a magnitude of difference between said reference image and said vehicle image, and for determining said width of said vehicle and said length of the vehicle using said magnitude of difference between said reference image and said vehicle image;

a contact signal processing unit determining a number of axles of said vehicle and discriminating between forward movement and backward movement of said vehicle by an order and a number of a plurality of respective contact signals generated at a plurality of switch contacts of said axle detector; and a vehicle class determiner unit comparing said width of said vehicle and said length of said vehicle determined in said image processing unit and a number of axles of said vehicle determined by said contact signal processing unit with a plurality of vehicle class data and determining a corresponding class for said vehicle.

11. The apparatus of claim 10, further comprised of said image processing unit comprising:

an image receiving unit for receiving said reference image and said vehicle image from said camera;

an image storing unit for discarding said reference image when a difference between said reference image and a previously stored reference image is larger than a predetermined difference value and said image storing unit otherwise replacing said previously stored reference image with said reference image;

a difference value image generating unit for determining said magnitude of difference between said reference image and said vehicle image received from said image receiving unit when said reference image is temporarily stored in said image storing unit, and said difference value image generating unit for determining said magnitude of difference between said previously stored reference image and said vehicle image when said reference image is discarded; and a vehicle width and length calculating unit for determining said width of said vehicle and said length of said vehicle using said magnitude of difference determined by said difference value image generating unit.

12. The apparatus of claim 8, further comprised of said vehicle sensor being a microwave sensor.

13. The apparatus of claim 8, further comprised of said separation detector being comprised by an optical sensor having a light emitting device and a light receiving device opposingly installed across said traffic lane, said separation detector determining said period of time when an optical signal from the light emitting device is interrupted, said period of time representing the time between when said front end of said vehicle passes said separation detector and when said rear end of said vehicle passes said separation detector.

14. A process for determining a class of a vehicle entering a traffic lane, comprising the steps of:

detecting said vehicle entering said traffic lane and photographing a background of said vehicle using a camera to generate a reference image that is stored in a memory of a vehicle class determiner;

photographing said vehicle with said background when a first axle of said vehicle is detected by an axle detector to generate a vehicle image;

discarding said reference image when said reference image is different from a previously stored reference image by more than a predetermined amount, and storing said reference image otherwise;

determining a width of said vehicle and a length of said vehicle using a difference between said vehicle image and said reference image when said reference image is not discarded, and determining said width of said vehicle and said length of said vehicle using a difference between said vehicle image and said previously stored reference image when said reference image is discarded;

determining a number of axles of said vehicle using said axle detector; and determining said class of said vehicle using said vehicle class determiner to compare said width of said vehicle, said length of said vehicle, and said number of axles of said vehicle with a plurality of vehicle class data.

15. The process of claim 14, further comprising the step of storing said reference image, when said reference image is not discarded, and storing said vehicle image after determining said class of said vehicle to use for future evidentiary purposes.

* * * * *